United States Patent
Scherbarth

(10) Patent No.: US 8,948,591 B2
(45) Date of Patent: Feb. 3, 2015

(54) METHOD FOR OPERATING A PULSED INTERFERENCE LASER IN AN EYE-SAFE MANNER IN A DIRCM SYSTEM

(75) Inventor: Stefan Scherbarth, Markdorf (DE)

(73) Assignee: EADS Deutschland GmbH, Ottobrunn (DE)

( * ) Notice: Subject to any disclaimer, the term of this patent is extended or adjusted under 35 U.S.C. 154(b) by 493 days.

(21) Appl. No.: 13/201,164

(22) PCT Filed: Jan. 27, 2010

(86) PCT No.: PCT/DE2010/000091
§ 371 (c)(1),
(2), (4) Date: Aug. 11, 2011

(87) PCT Pub. No.: WO2010/094254
PCT Pub. Date: Aug. 26, 2010

(65) Prior Publication Data
US 2011/0311224 A1    Dec. 22, 2011

(30) Foreign Application Priority Data
Feb. 19, 2009 (DE) .......................... 10 2009 009 698

(51) Int. Cl.
*H04B 10/11* (2013.01)
*G01S 17/02* (2006.01)
*G01S 7/495* (2006.01)

(52) U.S. Cl.
CPC ............... *G01S 7/495* (2013.01); *G01S 17/026* (2013.01)
USPC .......................................................... 398/39

(58) Field of Classification Search
USPC .......................................................... 398/39
See application file for complete search history.

(56) References Cited

U.S. PATENT DOCUMENTS

| 5,837,996 | A | 11/1998 | Keydar |
| 6,130,754 | A | 10/2000 | Greene |
| 6,369,885 | B1 | 4/2002 | Brown et al. |
| 2006/0000987 | A1* | 1/2006 | Weber ........................ 250/504 R |

(Continued)

FOREIGN PATENT DOCUMENTS

| DE | 44 02 855 A1 | 8/1995 |
| WO | WO 2004/046750 A2 | 6/2004 |
| WO | WO 2006/077588 A2 | 7/2006 |

OTHER PUBLICATIONS

Chow et al.; Protecting Commercial Aviation Against the Shoulder-Fired Missile Threat; Addendum; Mar. 1, 2006, pp. 20-21, [online], [retrieved on Nov. 8, 2013]. Retrieved from the Internet <URL: http://www.rand.org/content/dam/rand/pubs/occasional_papers/2006/RAND_OP106.addendum.pdf>.*

(Continued)

*Primary Examiner* — Nathan Curs
(74) *Attorney, Agent, or Firm* — Crowell & Moring LLP

(57) ABSTRACT

A method for operating a pulsed interference laser in an eye-safe manner in a DIRCM system onboard an aircraft is provided. A reception apparatus is used to receive echoes from the emitted pulses from the interference laser and to evaluate them to determine whether an object is situated within a prescribed laser safety distance for the DIRCM system in the laser beam. The emission of the laser beam is enabled separately for a respective period of time $\Delta t$ within the period of use of the interference laser, the emission being enabled for the respective subsequent period of time $\Delta t$ only if no object has been found within the laser safety distance within the respective preceding period of time $\Delta t$.

5 Claims, 1 Drawing Sheet

(56) References Cited

U.S. PATENT DOCUMENTS

2006/0238617 A1   10/2006   Tamir
2011/0096320 A1*  4/2011   Krupkin et al. ............... 356/27

OTHER PUBLICATIONS

Google search results page showing the date the Chow et al. document was available on the internet (indexed by Google).*

Corresponding International Search Report with English Translation dated Jun. 4, 2010 (six (6) pages).

S. Scherbarth et al., "Eye Safe Laser Based DIRCM Systems", Proceedings of SPIE—The International Society for Optical Engineering—Technologies for Optical Countermeasures VI, Sec. 3.3: DIRCM safety device using active beam supervision, "backscatter detection", Sep. 25, 2009, vol. 7483 (ten (10) pages).

* cited by examiner

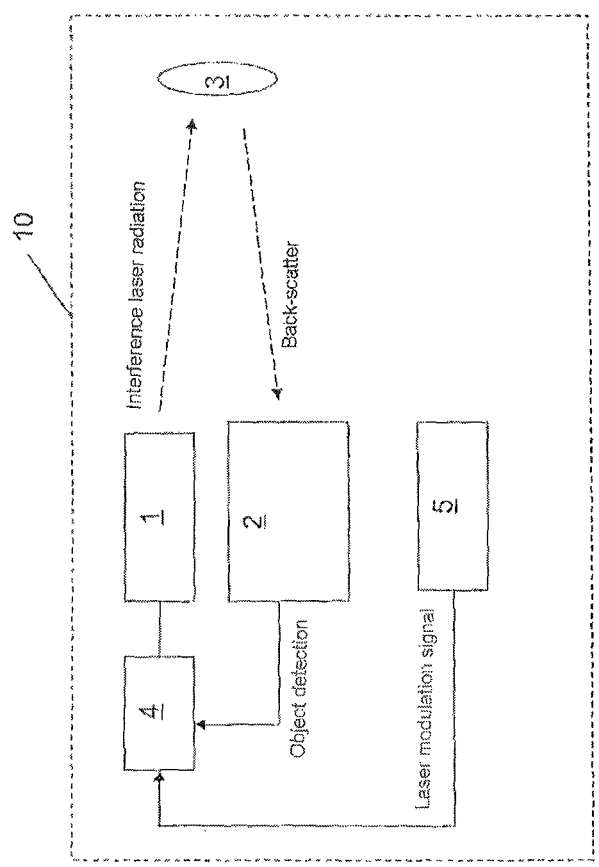

METHOD FOR OPERATING A PULSED INTERFERENCE LASER IN AN EYE-SAFE MANNER IN A DIRCM SYSTEM

BACKGROUND AND SUMMARY OF THE INVENTION

The invention relates to a method for operating a pulsed interference laser in an eye-safe manner in a DIRCM system onboard an aircraft.

Military and, increasingly, civil aircraft are threatened by attacks from ground-air guided missiles. The most widely used guided missiles are what are known as the MANPADS (man portable air defense system) with a seeker head operating in the infrared spectral range.

One possible counter measure is the emission of directional IR laser radiation, modulated with a suitable interference sequence, against the approaching guided missile in order to disturb the seeker head thereof and to lure it away from the target. Such systems are called DIRCM systems (DIRCM—Direct Infrared Counter Measures) and are known, for example, from DE 4402855A1 or U.S. Pat. No. 6,369,885B1.

In order to be effective, the interference radiation intensity produced by the DIRCM system needs to be significantly higher than the infrared emission from the aircraft that is to be protected. The use of excessively low interference intensities is counterproductive, since it makes it easier for the approaching guided missile to track its target.

This interference radiation is usually produced using a pulsed laser having a high repetition rate and short single pulse lengths.

The requisite high laser intensities result in a laser safety problem. By way of example, the eye safety range of a DIRCM system is up to several hundred meters according to the European laser protection regulation EN 60825-1. When operating the DIRCM system, it is therefore necessary to ensure that no people without laser protection are within this laser safety distance. This results in restrictions in the authorization and use of a DIRCM system particularly for situations such as takeoff and landing, in which the potential threat is at its highest and therefore protection by a DIRCM system is most important.

In order to ensure that the prescribed laser safety range is observed, use restrictions are provided with the aid of an additional sensor system. Thus, according to ANSI standard Z 136.6-2005 section 4.2.7.2 and section 10.5.9 (Laser Institute of America), for example, the laser is switched off when the altitude of the aircraft is lower than the NOHD (Nominal Ocular Hazard Distance) or NOHD extended for the laser. The altitude is usually determined in aircraft by a radar altimeter. This method has the drawback that below a level corresponding to the NOHD or the NOHD extended there is no protection provided for the aircraft by a DIRCM—particularly when the threat is at its greatest.

For military applications and authorizations, it is usually the responsibility of the pilot to disable activation of the laser system when he cannot rule out people within the laser safety range from being at risk. This practice, however, is unacceptable for civil applications and authorizations. Since many military aircraft are also authorized and used for civilian purposes, this practice is also highly disadvantageous for military aircraft.

From the area of laser rangefinders and laser free-field data transmission, special methods for making a non-eye-safe laser beam safe are known:

U.S. Pat. No. 6,130,754 B1 discloses that the non-eye-safe laser beam is surrounded by an additional eye-safe sheathing beam. Objects entering the sheathing beam are detected from the back-reflections and the non-eye-safe beam is switched off. These methods can, in principle, be transferred to a DIRCM system but have the drawback that a second eye-safe laser beam and also the appropriate optical system for encasing the non-eye-safe beam and for receiving the back-reflections from said sheathing beam are required. All in all, this has considerable technical complexity.

U.S. Pat. No. 5,837,996 B1 discloses that before the non-eye-safe beam is enabled, the back-reflection from an eye-safe "test laser" is checked to determine whether there is no object, and hence also no human being, situated within the laser protection zone. This method could be used for a DIRCM system only if the test laser is outside of the spectral range seen by the seeker head of the guided missile. If not, the relatively weak test laser according to U.S. Pat. No. 5,837,996 B1 would be detrimental to the DIRCM application, since it assists the seeker head in detecting the target. The use of a test laser in a different spectral range therefore again requires considerable technical complexity.

Exemplary embodiments of the present invention provide a method that allows a DIRCM system to be operated in an eye-safe manner, specifically without resultant restrictions in the use of the DIRCM system, without detrimental effects on the function thereof and with as little complexity in terms of apparatus as possible.

On account of its optical system and the intensities required for operation, the DIRCM system that is to be made safe is said to have a prescribed laser safety distance of several hundred meters (e.g. NOHD extended according to EN 60825-1) for an operationally required period of use of the laser of several seconds. This laser safety distance is subsequently called the "original laser safety distance" of the DIRCM system.

According to the invention, the interference laser is provided with an additional disabling apparatus which can prevent the emission of the laser radiation after a period of time $\Delta t$. This disabling apparatus can operate using the modulation device for the laser beam—which device is already present in the DIRCM system—or else independently thereof, e.g., it may be implemented as mechanical beam blocking.

The period of time $\Delta t$ is proportioned such that the laser safety distance obtained (e.g. according to EN 60825-1) from the laser energy emitted in this time (subsequently called "reduced laser safety distance") assumes an acceptable, low value.

It is not possible to reduce the power of the interference laser radiation in a DIRCM system, because this can result in significant impairment of function, or even reversal of the function: instead of diverting the approaching guided missile, it is guided to the DIRCM system. Hence, the interference laser beam is not eye-safe over the period of time $\Delta t$ either. However, the brevity of $\Delta t$ means that the resulting (e.g. according to EN 60825-1) reduced laser safety distance is significantly shorter than the original laser safety distance, which is essentially obtained from the period of laser use of several seconds required for the DIRCM operation.

During the period of time $\Delta t$, the back-scatter from the interference laser pulses is measured in time-resolved fashion by a reception apparatus and, if appropriate, the delay time is used to ascertain whether the distance of an object situated in the beam from the interference laser is shorter than the original laser safety distance. If no objects are detected within the original laser safety distance during this period of time $\Delta t$, the emission of the laser radiation is in turn enabled just for a period of time Δt, e.g., by resetting the timer in the disabling apparatus. This process is repeated throughout the period of use of the DIRCM laser. If an object is detected within the original laser safety distance during one of the successive periods of time Δt, however, the emission of the laser radiation is terminated at the end of the relevant period of time Δt within which the object was detected.

This method ensures that, when an object is detected in the laser beam within the original laser safety distance, the laser emission is prevented no later than after a period of time Δt. The object is therefore exposed to the laser irradiation only for a maximum of this period of time Δt. The entire DIRCM system is therefore eye-safe, with the exception of the area within the reduced laser safety distance. This reduced laser safety distance determined by the period of time Δt can be significantly shorter than the original laser safety distance of the DIRCM system.

The size of the original and the reduced laser safety distance is dependent in both cases on the optical design of the DIRCM system, with the reduced laser safety distance additionally being dependent on the length of the chosen period of time Δt. In a typical design, for example, values for the original laser safety distance=200 m, the reduced laser safety distance=10 m and Δt=0.1 s are obtained.

The effect of introducing the relatively long period of time Δt—up to several hundred meters for a distance measurement—is that the possible presence of objects within the original laser safety distance in the laser beam can be determined with a high level of reliability and negligible missed detection rate from a multiplicity of single laser pulses. This prevents the disabling apparatus from responding incorrectly.

The remaining small protection range within the reduced laser safety distance can, as is customary in the case of aircraft for the purpose of making weather radars safe, for example, be made safe using a "Weight on Wheels" (WOW) switch. This disables the laser emission as soon as the landing gear of the aircraft is put under load, that is to say that the aircraft is on the ground. The laser emission is therefore enabled by the WOW switch only when an aircraft is in flight. On account of the small size of the reduced laser safety distance, it is therefore possible to reliably prevent people from being in the laser protection range.

Deactivation of the DIRCM system below a minimum level is therefore not necessary. The DIRCM system equipped according to the invention therefore has no use restrictions that are conditional upon laser safety.

The method according to the invention also results in an approaching guided missile initiating disablement of the laser emission if it is closer to the aircraft than the original laser safety distance. Combat of this guided missile is therefore terminated after the period of time Δt after the guided missile has breached the original laser safety distance. Since combating the guided missile with infrared interference radiation is not effective in practice at the resulting short distances, this does not lead to a relevant restriction of function for the DIRCM system protected according to the invention.

Since, without the response of the disabling mechanism, the intensity of emission and the modulation of the interference laser are not changed in any way, there are no kind of restrictions in the operation of the DIRCM system protected according to the invention in this case either.

The period of time Δt can be firmly prescribed. In one alternative embodiment, however, the period of time Δt during which the laser is enabled in each case is determined continuously from the modulation of the interference radiation such that a firmly prescribed value for the reduced laser safety distance is not exceeded within the period of time Δt. This means that, depending on the actual modulation (particularly the on/off ratio of the laser is significant in this context) of the interference laser, a relatively high value may be used for the period of time Δt, which results in an improvement in the misinitiation rate of the protection mechanism.

In a further advantageous embodiment, the original laser safety distance, up to which the detection of an object results in initiation of the disabling mechanism, is not set permanently but rather is determined in each case from the already passed period of emission of the interference laser beam within the last 10 seconds. According to EN 60825-1, the original laser safety distance for a DIRCM system increases with the period of irradiation, allowing for irradiation for 10 s maximum. The current original laser safety distance is, therefore, significantly shorter after a period of laser use of 1 s, for example, than after 5 s, for example. It is therefore sufficient to check for the presence of objects within the current laser safety distance in each case. This in turn results in an improvement in the misinitiation rate and also in a shorter useable minimum combat distance.

BRIEF DESCRIPTION OF THE DRAWING FIGURE

The invention is explained in more detail using an exemplary embodiment with reference to a FIGURE. The FIGURE shows a schematic illustration of the components of a DIRCM system 10 which are relevant for the performance of the method according to the invention.

DETAILED DESCRIPTION

The system comprises the pulsed interference laser 1 for combating an approaching guided missile. A reception device 2 receives the back-scatter from the emitted laser radiation and evaluates it. This involves measuring the distance of the object 3 causing the back-scatter. The disabling apparatus 4 coupled to the interference laser 1 enables the emission of the laser energy only for a respective period of time Δt. The emission is enabled for the subsequent period of time only if the reception device 2 does not detect an object within the original laser safety distance during the current period of time Δt. Otherwise, the emission of the laser radiation is suppressed at the end of the current period of time Δt.

The disabling apparatus 4 operates on the basis of the embodiment shown in the FIGURE, by acting on the modulation device for the laser beam (DIRCM control computer 5). Alternatively, the disabling apparatus can also be implemented as mechanical beam blocking.

The invention claimed is:

1. A method for operating a pulsed interference laser in an eye-safe manner in a DIRCM system onboard an aircraft, comprising:
   receiving, by a reception apparatus, echoes from emitted pulses from the interference laser during an initial period of time Δt;
   evaluating, by the reception apparatus, the received echoes to determine whether an object is situated within an original laser safety distance for the DIRCM system in the laser beam; and
   separately enabling the emission of the laser beam for a second period of time Δt within a period of use of the interference laser, wherein the emission is enabled for the second period of time Δt only when no object has been found within the original laser safety distance within the initial period of time Δt, wherein the initial period of time Δt and the second period of time Δt are set so that the emission of the laser beam during the initial period of time Δt and the second period of time Δt is eye-safe at a reduced laser safety distance, which is shorter than the original laser safety distance, and wherein a radiation intensity of the emitted laser beam during the initial period of time Δt and the respective second period of time Δt is higher than infrared emissions from the aircraft.

2. The method as claimed in claim 1, wherein the initial and second periods of time Δt are a predetermined fixed value.

3. The method as claimed in claim 1, wherein any further emission of the laser is prevented regardless of the presence of an object within the laser safety distance when a weight-on-wheels switch of the aircraft indicates that the aircraft is on the ground.

4. A method for operating a pulsed interference laser in an eye-safe manner in a DIRCM system onboard an aircraft, comprising:
   receiving, by a reception apparatus, echoes from emitted pulses from the interference laser during first period of time Δt;
   evaluating, by the reception apparatus, the received echoes to determine whether an object is situated within a prescribed laser safety distance for the DIRCM system in the laser beam; and
   separately enabling the emission of the laser beam for a second period of time Δt within a period of use of the interference laser, wherein the emission is enabled for a third period of time Δt only when no object has been found within the laser safety distance within the second period of time Δt, wherein the second period of time Δt is determined from interference laser beam modulation generated by the DIRCM system during the emission of pulses from the interference laser during the first period of time Δt, and the third period of time Δt is determined from the interference laser beam modulation generated by the DIRCM system during the second period of time Δt.

5. A method for operating a pulsed interference laser in an eye-safe manner in a DIRCM system onboard an aircraft, comprising:
   receiving, by a reception apparatus, echoes from emitted pulses from the interference laser for an initial period of time Δt;
   evaluating, by the reception apparatus, the received echoes to determine whether an object is situated within a prescribed laser safety distance for the DIRCM system in the laser beam; and
   separately enabling the emission of the laser beam for a second period of time Δt within a period of use of the interference laser, wherein the emission is enabled for the second period of time Δt only when no object has been found within the laser safety distance within first period of time Δt, wherein the laser safety distance is determined from a period of use of the interference laser within a 10 second period previous to the emitted pulses during the first period of time Δt.

* * * * *